UNITED STATES PATENT OFFICE.

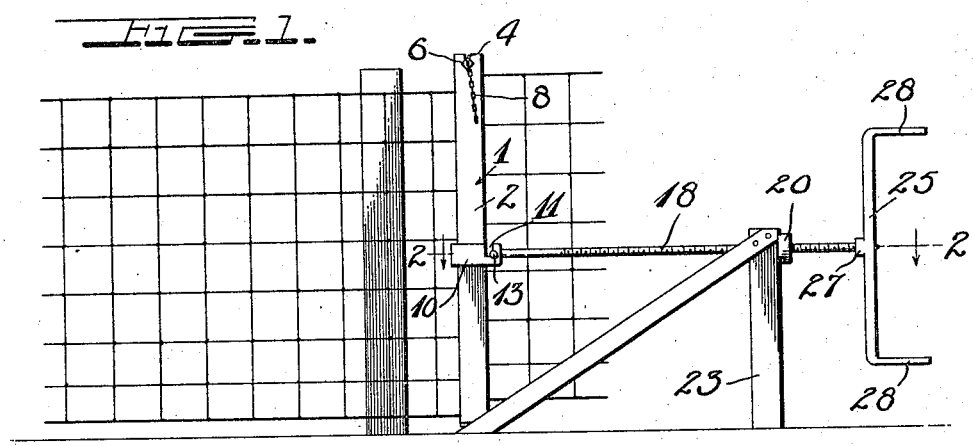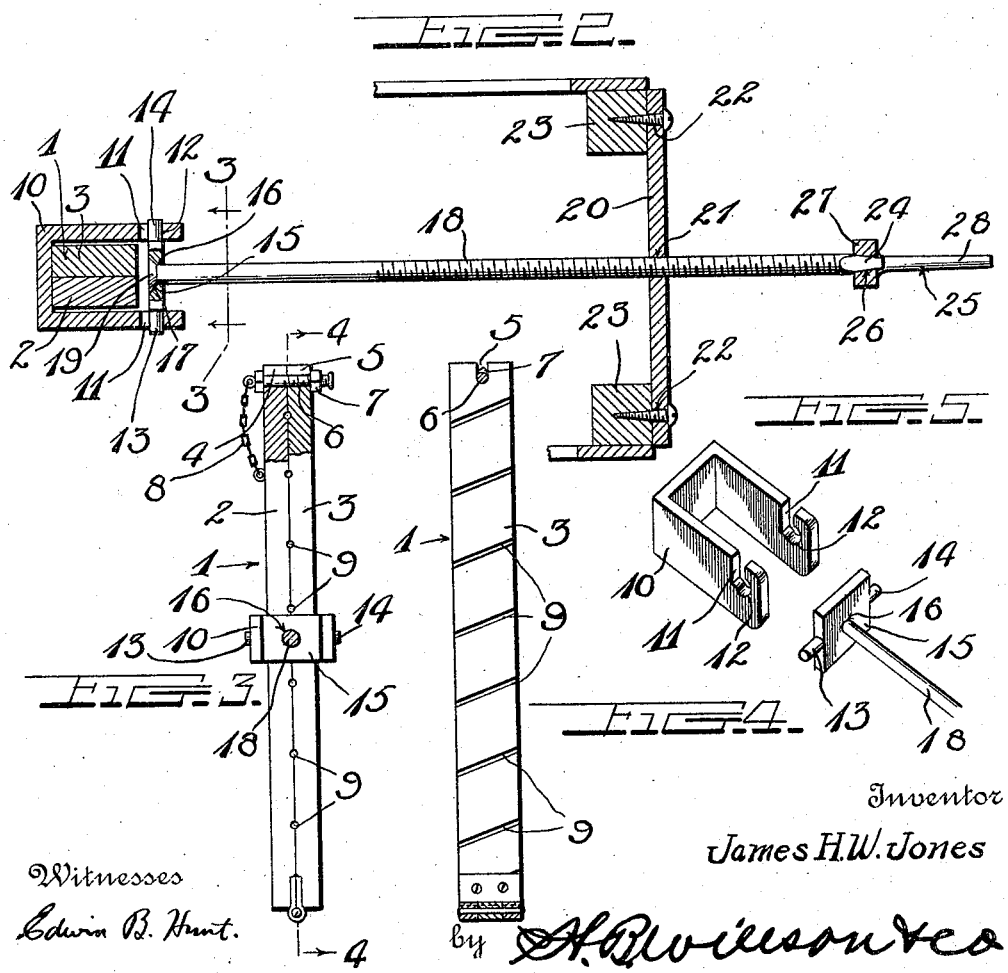

JAMES H. W. JONES, OF CORYDON, KENTUCKY.

WIRE-STRETCHER.

1,179,326.  Specification of Letters Patent. Patented Apr. 11, 1916.

Application filed April 22, 1915. Serial No. 23,249.

*To all whom it may concern:*

Be it known that I, JAMES H. W. JONES, a citizen of the United States, residing at Corydon, in the county of Henderson and State of Kentucky, have invented certain new and useful Improvements in Wire-Stretchers; and I do declare the following to be a full, clear, and exact description of the invention, such as will enable others skilled in the art to which it appertains to make and use the same.

This invention relates to improvements in wire stretchers and more particularly to those which are designed to stretch woven wire fences, although its application need not be limited in this respect.

The primary object of the invention is to provide a wire stretcher which may be simply and inexpensively constructed and yet be highly efficient in operation.

Another object is to provide a device of this character which has no chains or bolts to be screwed or unscrewed and hence effects a great saving in time when placing and removing it.

With these and other objects in view, the invention consists of certain novel features of construction, and the combination and arrangement of parts as will be more fully described and claimed.

In the accompanying drawings: Figure 1 represents a side elevation of this improved stretcher applied; Fig. 2 is a horizontal section taken on the line 2—2 of Fig. 1; Fig. 3 is a transverse section taken on the line 3—3 of Fig. 2; Fig. 4 is a section of the clamp taken on the line 4—4 of Fig. 3; Fig. 5 is a detail perspective view of the clamp encircling band and its rod connecting bar arranged in juxtaposition ready for assembling.

In the embodiment illustrated, a wire engaging clamp 1 is shown composed of two hingedly connected jaws 2 and 3 in the form of bars which are hingedly connected at one end and provided at their free ends with registering recesses 4 and 5 which extend transversely through said ends and are in the form of open slots to receive a connecting bolt 6 which is of a length greater than the combined thickness of the two bars 2 and 3 and is provided at one end with the usual head and has a nut 7 mounted for adjustment thereon with the free end of said bolt upset to prevent said nut from becoming detached therefrom. This bolt 6 is preferably connected with one of the jaws by means of a small chain 8 to prevent the bolt from becoming lost. When this bolt is to be used for connecting the free ends of the jaws 2 and 3 it is slipped into the recesses 4 and 5 through the open ends thereof, and the nut 7 tightened for holding said jaws in closed position and which prevents the necessity of inserting a bolt through apertures in the usual manner, the open slots being a quick method of attaching it.

The inner or clamping faces of the jaws 2 and 3 are provided with a plurality of longitudinally spaced diagonally extending grooves 9, those in one face registering with those in the other and which are designed to receive the strands of wire to be stretched, it being understood that when the wire is inserted in these grooves and the clamp disposed in upright position, the ends of the wire so engaged will be bent at an angle to the body portion thereof and thus reliably grip the bars and prevent them from slipping from between said jaws.

A clamp encircling band 10 is here shown in the form of a U-shaped member having registering slots 11 extending transversely inward from one edge of the legs of said member near their free ends, said slots being provided at their inner ends with semicircular recesses 12 formed in the side wall adjacent the free ends of the legs of said member and which are designed to receive pintles 13 and 14 which extend longitudinally from the opposite ends of a cross bar or plate 15 which is adapted to span and close the space between the free ends of the legs of the member 10, the pintles being adapted to turn in the recesses 12 for a purpose to be described. This bar or plate 15 has an aperture 16 therein, the inner walls of which are flared as shown at 17 to receive and form a swiveled connection with the headed end of a screw threaded rod 18, the head 19 of said rod being designed to fit and turn in the flared portion of the aperture 16. This rod 18 is threaded throughout the greater portion of its length and is adapted to be inserted in a threaded aperture 21 formed in a draw head 20. This draw head 20 is shown in the form of a metal bar having a threaded aperture 21 disposed midway its ends and said ends provided with bolt or screw receiving openings 22 for attaching said draw head to a support, posts 23 being here shown for this purpose. The free end of this rod 18 is made angular in cross section as shown at 24 to receive a detachable handle 25, said handle being here shown in the form of a metal bar having an angular aperture 26, the cross sectional shape of which corresponds to that of the angular end 24 of the rod 18, and thus securely holds said handle in fixed engagement with said rod. A boss 27 preferably surrounds this aperture 26 for reinforcing the handle at this point. This handle bar is provided at its free ends with right angularly disposed hand grips 28 to facilitate the turning of the rod so that two persons may operate it when found necessary or desirable.

The operation of this improved stretcher is as follows: The jaws 2 and 3 of the clamp 1 are opened by first removing the bolt 6 from the slotted ends thereof and these bars are then engaged with the wire strands or fabric to be stretched by inserting said fabric in the grooves 9 of said clamping jaws. The jaws are then brought together and secured in clamping engagement by inserting the bolt 6 in the slots in the free ends thereof and then tightening the nuts 7, whereby said jaws are reliably held in clamped relation. The band 10 is then slipped over the clamp 1 with the rod 18 in swiveled engagement therewith, said rod having been first inserted through the aperture 16 in the cross bar or plate 15 and the pintles 13 and 14 of said plate having been engaged with the slotted ends of the legs of the band 10. This peculiar connection of the rod with the band provides for the positioning of the rod head 19 at any suitable or desired angle within a certain limit which is controlled by the space between the plate or cross bar 15 and the adjacent side edges of the clamp, the engagement with the upper or lower edge of said plate with said side edges serving as stops for limiting the vertical movement of the head 19.

When the parts have been positioned as above described, the draw head 20 is engaged with the posts 23 or any other suitable support and bolts or screws are passed through the apertures in the ends of said head and are screwed into the posts but not necessarily so, and the device is then ready for tightening the fence. While screws are shown connecting the head 20 with the posts they may be dispensed with if desired and the head 20 simply rested against the posts. This tightening is accomplished by inserting the angular end 24 of the rod 18 in the angular aperture 26 of the handle 25. The handle is then turned in the proper direction for drawing the clamp 1 toward the draw head which exerts a pulling action on the wire carried by said clamp which may be tightened to the desired extent, and after being so tightened is fastened in the usual manner to the ordinary fence posts.

I claim as my invention:

1. In a wire stretcher the combination of wire clamping jaws, a U-shaped member encircling said jaws and having slots extending laterally inward from one edge of the legs thereof, said slots terminating at their inner ends in bearing recesses, the slot in one leg registering with that in the other, a cross bar disposed between said legs and having pintles at its opposite ends engaged with said bearing recesses, and a rod having swiveled connection with said cross bar.

2. In a wire stretcher the combination of wire clamping jaws, a U-shaped member encircling said jaws and having slots extending laterally inward from one edge of the legs thereof, said slots terminating at their inner ends in bearing recesses formed in the lower ends of the front walls of said slots, and pulling means having pintles engaged with said recesses.

In testimony whereof I have hereunto set my hand in presence of two subscribing witnesses.

JAMES H. W. JONES.

Witnesses:
JOHN S. DIXON,
GEORGE M. RANKIN.

Copies of this patent may be obtained for five cents each, by addressing the "Commissioner of Patents, Washington, D. C."